United States Patent
Sato et al.

(10) Patent No.: US 10,840,845 B2
(45) Date of Patent: Nov. 17, 2020

(54) VEHICLE DRIVE CONTROL DEVICE

(71) Applicant: AISIN AW CO., LTD., Anjo (JP)

(72) Inventors: Masakazu Sato, Anjo (JP); Yomei Hakumura, Nishio (JP); Masashi Miyazaki, Okazaki (JP); Masayoshi Yanagida, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 16/483,650

(22) PCT Filed: Jan. 23, 2018

(86) PCT No.: PCT/JP2018/001925
§ 371 (c)(1),
(2) Date: Aug. 5, 2019

(87) PCT Pub. No.: WO2018/173457
PCT Pub. Date: Sep. 27, 2018

(65) Prior Publication Data
US 2020/0036315 A1 Jan. 30, 2020

(30) Foreign Application Priority Data
Mar. 22, 2017 (JP) .................................. 2017-056210

(51) Int. Cl.
*H02P 27/00* (2006.01)
*H02P 27/04* (2016.01)
(Continued)

(52) U.S. Cl.
CPC ............ *H02P 27/045* (2013.01); *H02P 27/08* (2013.01); *H02P 29/0027* (2013.01); *H02P 29/0241* (2016.02)

(58) Field of Classification Search
CPC ...... B60Y 2200/92; B60K 6/387; B60K 6/54; B60W 20/00; H02P 27/045; H02P 27/08; H02P 29/0027; H02P 29/0241
See application file for complete search history.

(56) References Cited

U.S. PATENT DOCUMENTS 8,701,808 B2 * 4/2014 Zhu .................... B60K 6/387
180/65.6
10,351,002 B2 * 7/2019 Saha ......................... B60L 3/04
(Continued)

FOREIGN PATENT DOCUMENTS

| JP | 2008-141862 A | 6/2008 |
|---|---|---|
| JP | 2014-205463 A | 10/2014 |

(Continued)

OTHER PUBLICATIONS

Mar. 20, 2018 International Search Report issued in International Patent Application No. PCT/JP2018/001925.

Primary Examiner — Julio C. Gonzalez
(74) Attorney, Agent, or Firm — Oliff PLC

(57) ABSTRACT

A vehicle drive control device that controls a vehicle drive device in which a first engagement device, a rotating electrical machine, and a second engagement device are provided in this order from an input side in a mechanical power transmission path connecting an input to an output, the input being drive-coupled to an internal combustion engine serving as a vehicle drive power source, and the output being drive-coupled to wheels, wherein each of the first engagement device and the second engagement device can be changed between an engaged state in which drive power is transmitted and a disengaged state in which drive power is not transmitted, the vehicle control device including an electronic control unit.

15 Claims, 4 Drawing Sheets

(51) Int. Cl.
*H02P 29/024* (2016.01)
*H02P 27/08* (2006.01)
*H02P 29/00* (2016.01)

(56) References Cited

U.S. PATENT DOCUMENTS

| | | | |
|---|---|---|---|
| 2004/0055799 A1* | 3/2004 | Atarashi | B60W 20/00 |
| | | | 180/65.235 |
| 2008/0129237 A1 | 6/2008 | Atarashi et al. | |
| 2012/0271498 A1* | 10/2012 | Kobayashi | B60W 20/20 |
| | | | 701/22 |
| 2013/0005529 A1* | 1/2013 | Chen | B60K 6/442 |
| | | | 477/4 |
| 2014/0088813 A1* | 3/2014 | Kobayashi | B60K 6/547 |
| | | | 701/22 |
| 2014/0371029 A1* | 12/2014 | Kobayashi | B60K 23/02 |
| | | | 477/5 |
| 2015/0015168 A1 | 1/2015 | Terao | |
| 2015/0321664 A1* | 11/2015 | Bae | B60W 10/08 |
| | | | 701/22 |
| 2017/0232962 A1 | 8/2017 | Yamauchi et al. | |
| 2017/0305274 A1 | 10/2017 | Saha et al. | |

FOREIGN PATENT DOCUMENTS

| | | |
|---|---|---|
| JP | 2015-16830 A | 1/2015 |
| JP | 2017-144881 A | 8/2017 |
| WO | 2016/076429 A1 | 5/2016 |

\* cited by examiner

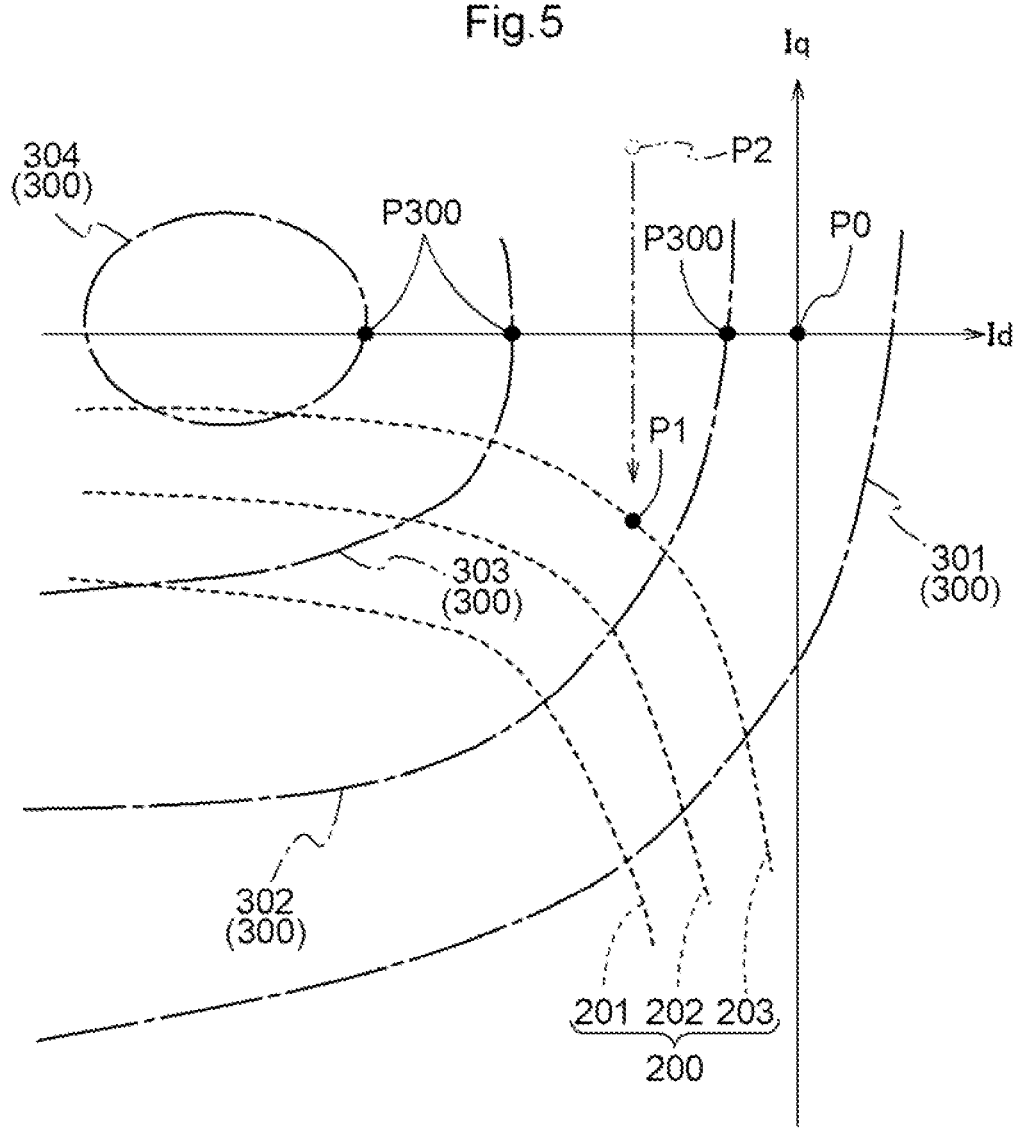

VEHICLE DRIVE CONTROL DEVICE

BACKGROUND

The present disclosure relates to a vehicle drive control device that controls a vehicle drive device that gives drive power to wheels.

WO 2016/076429 A whose source is shown below discloses a vehicle drive device in which a first engagement device (75), a rotating electrical machine (80), and a transmission device (90) including a second engagement device are provided in this order from an input member side in a mechanical power transmission path connecting an input member which is drive-coupled to an internal combustion engine (70) serving as a vehicle's drive power source to an output member which is drive-coupled to wheels (W) (WO 2016/076429 A: see FIGS. 1 and 2, claim 1, etc. Note that in the BACKGROUND ART the reference signs in parentheses are those provided in the literature referred to.). The drive of the rotating electrical machine (80) is controlled by an inverter control device (20) through a rotating electrical machine drive device (1) including an inverter (10). The inverter control device (20) performs switching control of switching elements (3) forming the inverter (10), and performs fail-safe control when a failure has occurred in the rotating electrical machine drive device (1). The fail-safe control includes, for example, shutdown control in which all switching elements (3) in the inverter (20) are brought into an off state, and active short-circuit control in which a current is allowed to flow back by bringing all upper-stage-side switching elements (31) for a plurality of phases or all lower-stage-side switching elements (32) for the plurality of phases in the inverter (20) into an on state.

When a vehicle travels at a relatively high speed and the rotational speed of the rotating electrical machine (80) is high, since counter-electromotive force of the rotating electrical machine (80) is large, shutdown control may not be able to be performed. In such a case, active short-circuit control is performed, but when high kinetic energy is supplied to the rotating electrical machine (80) from the wheels (W) rotating at a high speed, currents flowing through the rotating electrical machine (80) and the inverter (10) increase. If a large current continues to flow over an extended period of time, then there is a possibility that the inverter (10) and the rotating electrical machine (80) wear out due to the large current. Hence, for example, by disengaging the first engagement device (75) and bringing the transmission device (90) into a neutral state, the rotational speed of the rotating electrical machine (80) may be promptly reduced. However, with this method, since drive power from the vehicle drive device is not transmitted to the wheels (W), for example, evacuation travel in which the vehicle is pulled over and stopped on the side of the road may be hindered. Hence, it is desirable that the time during which drive power is not transmitted to the wheels (W) be short.

SUMMARY

In view of the above-described background, a technique is needed in which when an abnormality has occurred in a rotating electrical machine drive system that drives a rotating electrical machine provided in a mechanical power transmission path to wheels, the rotational speed of the rotating electrical machine is promptly reduced while suppressing an increase in electrical load on the rotating electrical machine drive system so as to reduce the time during which evacuation travel is affected.

As one aspect, a vehicle drive control device according to an exemplary aspect is a vehicle drive control device that controls a vehicle drive device in which a first engagement device, a rotating electrical machine, and a second engagement device are provided in this order from an input side in a mechanical power transmission path connecting an input to an output, the input being drive-coupled to an internal combustion engine serving as a vehicle drive power source, and the output being drive-coupled to wheels, wherein each of the first engagement device and the second engagement device can be changed between an engaged state in which drive power is transmitted and a disengaged state in which drive power is not transmitted, the vehicle control device including an electronic control unit that is configured such that: when an abnormality has occurred in a rotating electrical machine drive system including an inverter device and the rotating electrical machine, the electronic control unit brings the first engagement device and the second engagement device into a disengaged state, the inverter device being connected to a direct-current power supply and the rotating electrical machine and converting electric power between direct current and alternating current, by which the rotating electrical machine is driven.

By the first engagement device and the second engagement device going into a disengaged state, the rotating electrical machine goes into a state in which drive power from the wheels and the internal combustion engine is not transmitted. That is, counter-electromotive force that is generated by the rotating electrical machine rotated by the wheels and the internal combustion engine is suppressed. When the rotating electrical machine rotates when an abnormality has been detected in the rotating electrical machine drive system, the rotating electrical machine continues to rotate by inertia, but counter-electromotive force generated at that time is only that generated by the inertial rotation. The rotational speed of the inertial rotation can be reduced by controlling the rotating electrical machine. Hence, when an abnormality has occurred in the rotating electrical machine drive system that drives the rotating electrical machine provided in the mechanical power transmission path to the wheels, the rotational speed of the rotating electrical machine can be promptly reduced while suppressing an increase in electrical load on the rotating electrical machine drive system.

In addition, even when drive power to the wheels cannot be outputted due to the occurrence of an abnormality in the rotating electrical machine drive system, by bringing the first engagement device and the second engagement device into an engaged state, drive power generated by the internal combustion engine can be provided to the wheels. By this, when an abnormality has occurred in the rotating electrical machine drive system, a vehicle occupant can move and stop the vehicle in a safe location using drive power generated by the internal combustion engine. Note that the first engagement device and the second engagement device are brought into an engaged state on the condition that a rotational speed based on the rotational speed of the input, the rotating electrical machine, or the output (e.g., an estimated rotational speed of the rotating machine) is less than or equal to the reference rotational speed, and thus, the electrical load on the rotating electrical machine that generates electric power following the internal combustion engine and the wheels is suppressed. Namely, according to this configuration, when an abnormality has occurred in the rotating electrical machine drive system that drives the rotating electrical machine provided in the mechanical power transmission path to the wheels, the rotational speed of the rotating electrical machine can be promptly reduced while suppressing an increase in electrical load on the rotating electrical machine drive system so as to reduce the time during which evacuation travel is affected.

Further features and advantages of the vehicle drive control device will become clearer from the following description of an embodiment which will be described with reference to drawings.

BRIEF DESCRIPTION OF THE DRAWINGS

FIG. 5 is a diagram showing operating points of a rotating electrical machine in a current vector coordinate system.

DETAILED DESCRIPTION OF EMBODIMENTS

Figure 1:
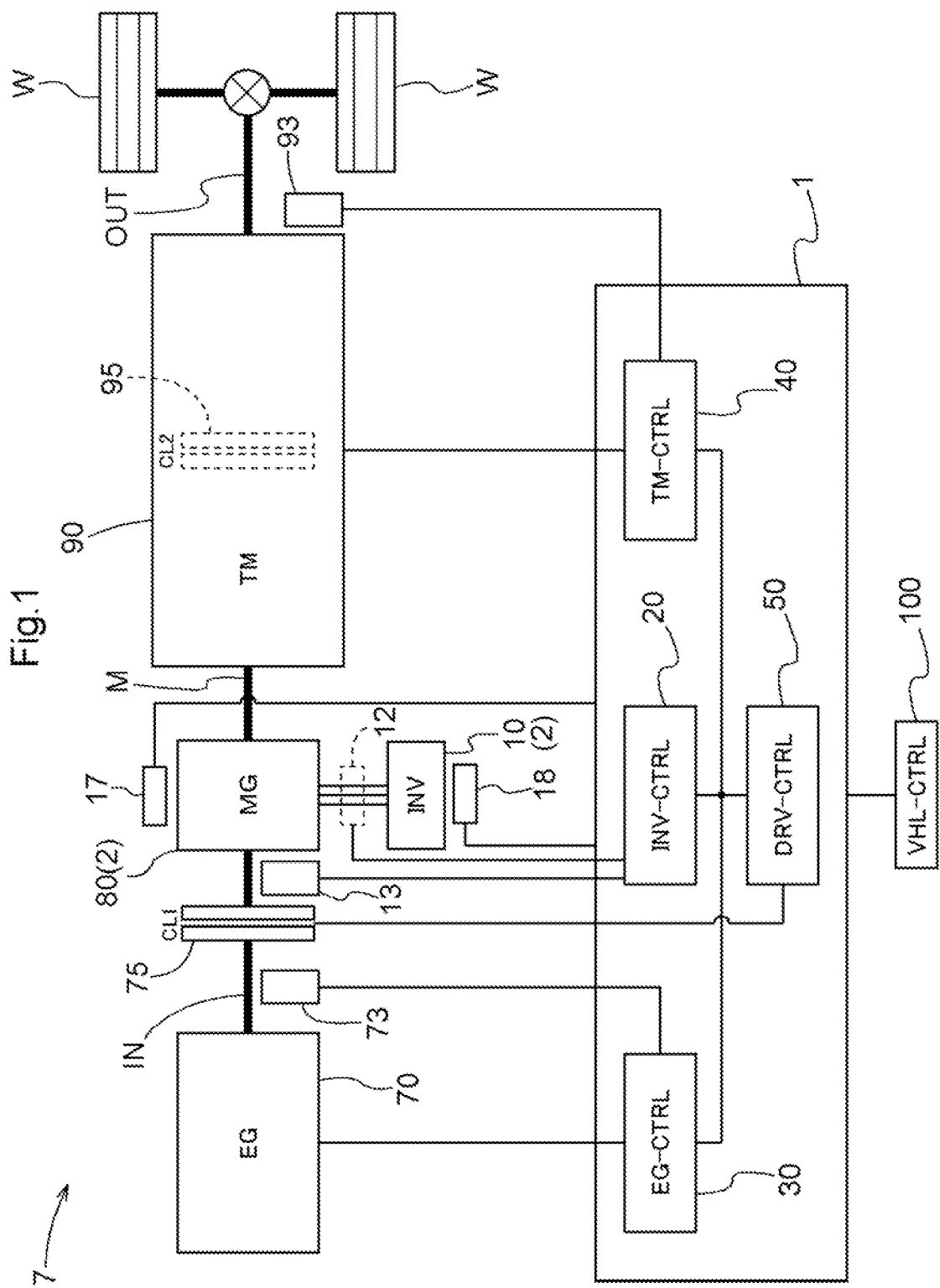
FIG. 1 is a schematic block diagram of a vehicle drive device and a vehicle drive control device.

An embodiment of a vehicle drive control device will be described below based on the drawings. A schematic block diagram of FIG. 1 shows a vehicle drive control device 1 and a vehicle drive device 7 which is a control target of the vehicle drive control device 1. As shown in FIG. 1, the vehicle drive device 7 includes a first engagement device (CL1) 75, a rotating electrical machine (MG) 80, and a second engagement device (CL2) 95 in this order from an input member IN side in a mechanical power transmission path connecting an input member IN which is drive-coupled to an internal combustion engine (EG) 70 serving as a vehicle's drive power source to an output member OUT which is drive-coupled to wheels W. Note that the present embodiment exemplifies a mode in which the first engagement device 75, the rotating electrical machine 80, and a transmission device (TM) 90 are provided in this order from the input member IN side in the mechanical power transmission path and the second engagement device 95 is included in the transmission device 90.

Note that here the term "drive-coupled" refers to a state in which two rotating elements are coupled together such that drive power can be transmitted. Specifically, the term "drive-coupled" includes a state in which the two rotating elements are coupled together such that they rotate together, or a state in which the two rotating elements are coupled together through one, or two or more power transmission members such that drive power can be transmitted. Such power transmission members include various types of members that transmit rotation at the same speed or at a changed speed and include, for example, shafts, gear mechanisms, belts, and chains. In addition, such power transmission members may include an engagement device that selectively transmits rotation and drive power, e.g., a friction engagement device and a mesh engagement device.

The vehicle drive control device 1 controls each part of the above-described vehicle drive device 7. In the present embodiment, the vehicle drive control device 1 includes an inverter control device (INV-CTRL) 20 which serves as the core to control the rotating electrical machine 80 through an inverter device (INV) 10 which will be described later; an internal combustion engine control device (EG-CTRL) 30 which serves as the core to control the internal combustion engine 70; a transmission device control device (TM-CTRL) 40 which serves as the core to control the transmission device 90; and a travel control device (DRV-CTRL) 50 that performs overall control of those control devices (20, 30, and 40). In addition, a vehicle also includes a vehicle control device (VHL-CTRL) 100 which is a higher-level control device of the vehicle drive control device 1 and controls the entire vehicle.

As shown in FIG. 1, the vehicle drive device 7 is a so-called parallel hybrid drive device including the internal combustion engine 70 and the rotating electrical machine 80 as vehicle's drive power sources. The internal combustion engine 70 is a heat engine driven by fuel combustion, and for example, a gasoline engine or a diesel engine can be used. The internal combustion engine 70 is drive-coupled to the rotating electrical machine 80 through the first engagement device 75, and switching can be performed between a state in which drive power is transmitted between the internal combustion engine 70 and the rotating electrical machine 80 and a state in which drive power is not transmitted between the internal combustion engine 70 and the rotating electrical machine 80, according to the state of the first engagement device 75. The present embodiment exemplifies a mode in which the first engagement device 75 is formed of a clutch.

As described above, the vehicle drive device 7 includes the transmission device 90. Here, the transmission device 90 is a stepped automatic transmission device having a plurality of shift speeds with different gear ratios. For example, the transmission device 90 includes a gear mechanism such as a planetary gear mechanism and a plurality of engagement devices (a clutch, a brake, etc.) to form a plurality of shift speeds. An input shaft of the transmission device 90 is drive-coupled to an output shaft (e.g., a rotor shaft) of the rotating electrical machine 80. Here, a member to which the input shaft of the transmission device 90 and the output shaft of the rotating electrical machine 80 are drive-coupled is referred to as a middle member M. The rotational speed and torque of the internal combustion engine 70 and the rotating electrical machine 80 are transmitted to the input shaft of the transmission device 90.

The transmission device 90 changes the rotational speed transmitted to the transmission device 90, at a gear ratio of each shift speed, and converts torque transmitted to the transmission device 90 and transmits the converted the torque to an output shaft of the transmission device 90. The output shaft of the transmission device 90 is split into two axles through, for example, a differential gear (output differential gear device), and the torque is transmitted to the wheels W which are drive-coupled to the respective axles. Here, the gear ratio is the ratio of the rotational speed of the input shaft to the rotational speed of the output shaft (=the rotational speed of the input shaft/the rotational speed of the output shaft) for when each shift speed is formed in the transmission device 90. In addition, torque obtained by multiplying torque transmitted to the transmission device 90 from the input shaft by the gear ratio corresponds to torque transmitted to the output shaft.

Note that although here a mode in which the transmission device 90 includes a stepped transmission mechanism is exemplified, the transmission device 90 may include a continuously variable transmission mechanism. For example, the transmission device 90 may include a continuously variable transmission (CVT) that allows continuous gear shifting by looping a belt or a chain around two pulleys to change the diameter of the pulleys.

The present embodiment exemplifies a mode in which the second engagement device 95 is included in the transmission device 90. That is, the second engagement device 95 switches between a state of transmitting drive power and a state of shutting off drive power between the input shaft and output shaft of the transmission device 90. For example, when the transmission device 90 is an automatic transmission device, the transmission device 90 may be formed using a planetary gear mechanism. In the planetary gear mechanism, the second engagement device 95 can be formed using one or both of a clutch and a brake. Namely, the second engagement device 95 is not limited to a clutch and may be formed using a brake.

Although the above description exemplifies a mode in which the first engagement device 75 is formed of a clutch, the first engagement device 75 may also be formed using a brake. Namely, the first engagement device 75 and the second engagement device 95 may be any device as long as they can be changed between an engaged state in which drive power is transmitted and a disengaged state in which drive power is not transmitted.

Meanwhile, in FIG. 1, reference sign 17 exemplifies a temperature sensor that detects the temperature of the rotating electrical machine 80, and reference sign 18 exemplifies a temperature sensor that detects the temperature of the inverter device 10 (the temperature of switching elements 3 which will be described later with reference to FIG. 1). The number of those temperature sensors is not limited to one for each of the rotating electrical machine 80 and the inverter device 10, and each temperature sensor may be provided at a plurality of locations. For the temperature sensors, sensors employing various principles such as thermistors, thermocouples, or non-contact temperature sensors (radiation thermometers) can be used as appropriate. In addition, reference sign 73 indicates a rotation sensor that detects the rotational speed of the internal combustion engine 70 or the input member IN, and reference sign 93 indicates a rotation sensor that detects the rotational speed of the wheels W or the output member OUT. In addition, though details will be described later, reference sign 13 indicates a rotation sensor that detects the rotation (speed, direction, angular velocity, etc.) of a rotor of the rotating electrical machine 80, and reference sign 12 indicates a current sensor that detects a current flowing through the rotating electrical machine 80. Note that in FIG. 1 a starter device for starting the internal combustion engine 70, various types of oil pumps (a motor-driven system and a mechanical system), etc., are omitted.

Figure 2:
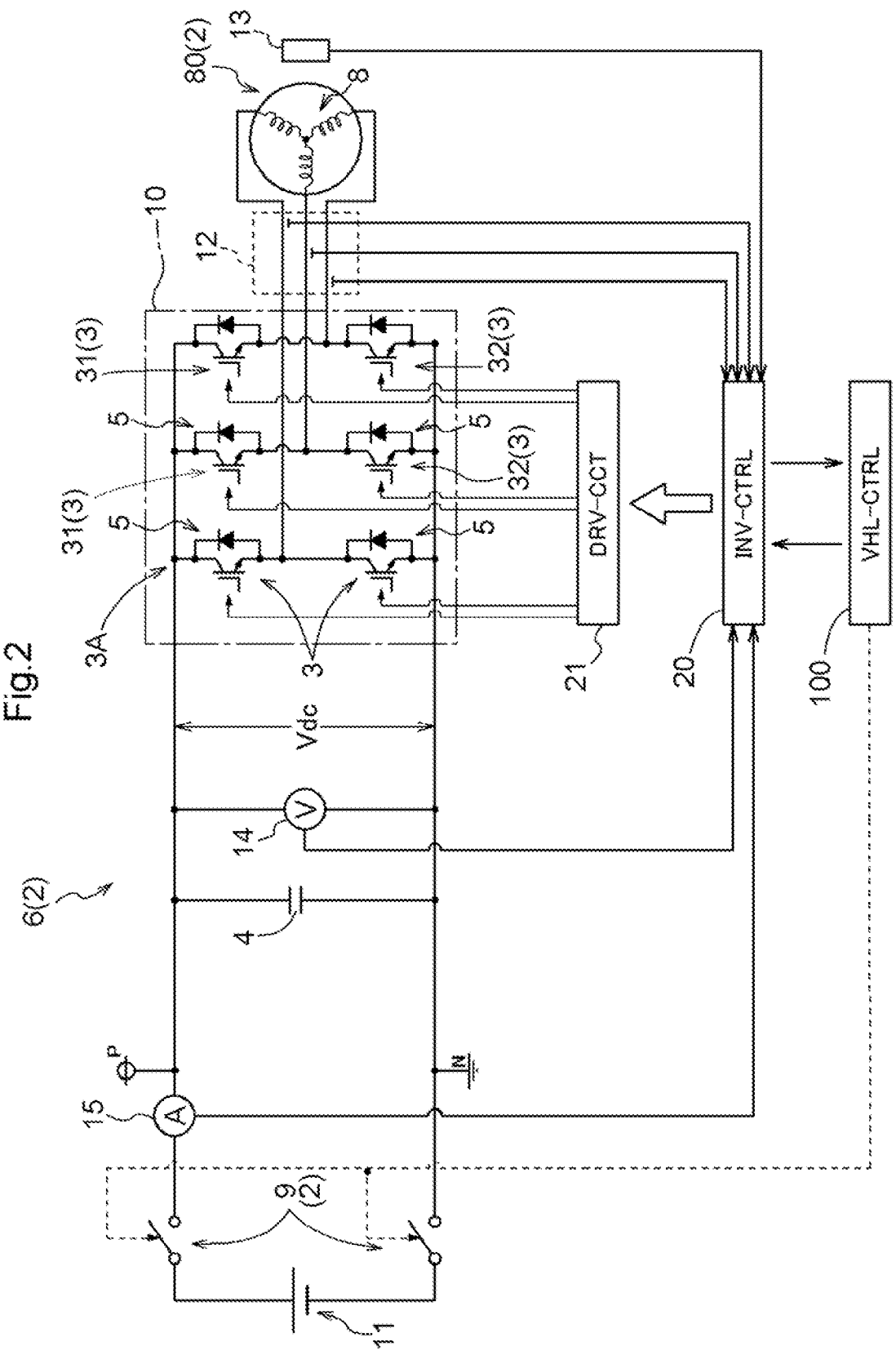
FIG. 2 is a schematic block diagram of a rotating electrical machine drive system and a control system thereof.

As described above, the drive of the rotating electrical machine 80 is controlled by the inverter control device 20 through the inverter device 10. A block diagram of FIG. 2 schematically shows a rotating electrical machine drive system 2 and a control system thereof. The rotating electrical machine drive system 2 includes a rotating electrical machine drive device 6 (the inverter device 10 and a direct-current link capacitor 4 which will be described later) and the rotating electrical machine 80, and the control system includes the inverter control device 20 and a drive circuit (DRV-CCT) 21 which will be described later. Note that reference sign 14 indicates a voltage sensor that detects a voltage on a direct-current side (a direct-current link voltage Vdc which will be described later) of the inverter device 10, and reference sign 15 indicates a direct current sensor that detects a current flowing through a high-voltage battery 11 (direct-current power supply) which will be described later.

The inverter device 10 is connected to the high-voltage battery 11 through contactors 9 and connected to the rotating electrical machine 80 of alternating current, and converts electric power between direct current and alternating current of a plurality of phases (here, three-phase alternating current). The rotating electrical machine 80 serving as a vehicle's drive power source is a rotating electrical machine that operates by alternating current of a plurality of phases (here, three-phase alternating current), and can also function as an electric motor and as a generator. Namely, the rotating electrical machine 80 converts electric power from the high-voltage battery 11 into mechanical power through the inverter device 10 (motoring). Alternatively, the rotating electrical machine 80 converts rotary drive power transmitted from the internal combustion engine 70 or the wheels W into electric power, and charges the high-voltage battery 11 through the inverter device 10 (regeneration).

The high-voltage battery 11 serving as an electric power source for driving the rotating electrical machine 80 is formed of, for example, a secondary battery (battery) such as a nickel-hydrogen battery or a lithium-ion battery, or an electric double-layer capacitor. The high-voltage battery 11 is a high-voltage, high-capacity direct-current power supply so as to supply electric power to the rotating electrical machine 80. The rated power supply voltage of the high-voltage battery 11 is, for example, from 200 to 400 [V].

A voltage between a positive-polarity power line P and a negative-polarity power line N on the direct-current side of the inverter device 10 is hereinafter referred to as a direct-current link voltage Vdc. On the direct-current side of the inverter device 10 there is provided a smoothing capacitor (direct-current link capacitor 4) that smooths the direct-current link voltage Vdc. The direct-current link capacitor 4 stabilizes a direct-current voltage (direct-current link voltage Vdc) that fluctuates according to the fluctuations of power consumption of the rotating electrical machine 80.

The contactors 9 are provided on an inverter device 10 side of the high-voltage battery 11. As shown in FIG. 2, the contactors 9 are disposed between the direct-current link capacitor 4 and the high-voltage battery 11. Namely, the inverter device 10 is connected to the rotating electrical machine 80 and connected to the high-voltage battery 11 through the contactors 9. The contactors 9 can cut off an electrical connection between the rotating electrical machine drive device 6 (the direct-current link capacitor 4 and the inverter device 10) and the high-voltage battery 11. When the contactors 9 are in a connected state (closed state), the high-voltage battery 11 and the inverter device 10 (and the rotating electrical machine 80) are electrically connected to each other, and when the contactors 9 are in a released state (open state), an electrical connection between the high-voltage battery 11 and the inverter device 10 (and the rotating electrical machine 80) is cut off.

Note that a DC/DC converter (not shown) that converts a direct-current voltage may be provided between the high-voltage battery 11 and the inverter device 10. When a DC/DC converter is provided, it is preferred that the contactors 9 be disposed between the DC/DC converter and the high-voltage battery 11.

In the present embodiment, the contactors 9 are mechanical relays that open and close based on an instruction from the vehicle control device (VHL-CTRL) 100 which is one of the highest-level control devices of the vehicle, and are referred to as, for example, system main relays (SMRs). When a vehicle's ignition key (IG key) is in an on state (effective state), the contacts of the system main relays are closed and the contactors 9 go into a conduction state (connected state), and when the ignition key is in an off state (ineffective state), the contacts of the system main relays are opened and the contactors 9 go into a non-conduction state (released state).

As described above, the inverter device 10 converts direct-current electric power having the direct-current link voltage Vdc into alternating-current electric power of a plurality of phases (n phases with n being a natural number; here, three phases) and supplies the alternating-current electric power to the rotating electrical machine 80, and converts alternating-current electric power generated by the rotating electrical machine 80 into direct-current electric power and supplies the direct-current electric power to the direct-current power supply. The inverter device 10 is configured to include a plurality of switching elements 3. For the switching elements 3, it is preferred to apply power semiconductor devices that can operate at high frequencies such as insulated gate bipolar transistors (IGBTs), power metal oxide semiconductor field effect transistors (MOSFETs), silicon carbide-metal oxide semiconductor FETs (SiC-MOSFETs), SiC-static induction transistors (SiC-SITs), and gallium nitride-MOSFETs (GaN-MOSFETs). FIG. 2 exemplifies a mode in which IGBTs are used as the switching elements 3.

As is well known, the inverter device 10 is formed of a bridge circuit having arms 3A, the number of which corresponds to the number of a plurality of phases. As shown in FIG. 2, one arm 3A is formed by connecting two switching elements 3 in series between the direct-current positive polarity side (positive-polarity power line P) and direct-current negative polarity side (negative-polarity power line N) of the inverter device 10. In the case of three-phase alternating current, three (three phases) series circuits (three arms) are connected in parallel. That is, a bridge circuit is formed in which one series circuit (arm) corresponds to each of stator coils 8 for the U-, V-, and W-phases of the rotating electrical machine 80. In addition, a diode 5 (freewheeling diode) is connected in parallel to each switching element 3, with a direction going from the lower-stage side to the upper-stage side being a forward direction.

A midpoint of each series circuit (arm 3A) including a pair of switching elements 3 for a corresponding phase, i.e., a connecting point between a switching element 3 on a positive-polarity power line P side (upper-stage-side switching element 31) and a switching element 3 on a negative-polarity power line N side (lower-stage-side switching element 32), is connected to a corresponding one of the three-phase stator coils 8 of the rotating electrical machine 80.

As shown in FIGS. 1 and 2, the inverter device 10 is controlled by the inverter control device 20. The inverter control device 20 is constructed using a logic circuit such as a microcomputer as a core member. For example, the inverter control device 20 controls the rotating electrical machine 80 through the inverter device 10 by performing current feedback control using a vector control method, based on a target torque of the rotating electrical machine 80 which is provided as a request signal from another control device such as the vehicle control device 100, etc., through a controller area network (CAN), etc.

Actual currents flowing through the stator coils 8 for the respective phases of the rotating electrical machine 80 are detected by a current sensor 12, and the inverter control device 20 obtains results of the detection. In addition, a magnetic pole position at each time point of the rotor of the rotating electrical machine 80 is detected by a rotation sensor 13, e.g., a resolver, and the inverter control device 20 obtains a result of the detection. The inverter control device 20 performs current feedback control using the results of the detection by the current sensor 12 and the rotation sensor 13. The inverter control device 20 is configured to include various functional parts for current feedback control, and each functional part is implemented by the cooperation of hardware such as a microcomputer and software (program). The current feedback control is publicly known and thus a detailed description thereof is omitted here.

A control terminal of each switching element 3 (e.g., a gate terminal of an IGBT) forming the inverter device 10 is connected to the inverter control device 20 through the drive circuit 21, and switching control of the switching elements 3 is individually performed. The vehicle control device 100 and the inverter control device 20 that generates a switching control signal are formed using a microcomputer, etc., as a core, and greatly differ in operating voltage (the power supply voltage of the circuit) from a high-voltage system circuit for driving the rotating electrical machine 80. In many cases, on the vehicle there is also mounted, in addition to the high-voltage battery 11, a low-voltage battery (not shown) which is a power supply with a lower voltage (e.g., from 12 to 24 [V]) than the high-voltage battery 11. The operating voltages of the vehicle control device 100 and the inverter control device 20 are, for example, 5 [V] or 3.3 [V], and the vehicle control device 100 and the inverter control device 20 operate by being supplied with electric power from the low-voltage battery.

The low-voltage battery and the high-voltage battery 11 are isolated from each other, and have a floating relationship. Hence, the rotating electrical machine drive device 6 includes the drive circuit 21 that improves each of driving capabilities (capabilities to allow a circuit at a subsequent stage to operate, e.g., voltage amplitude and output current) of a switching control signal (e.g., a gate drive signal) for each switching element 3, and relays (amplifies) the switching control signal. A switching control signal generated by the inverter control device 20 which is a low-voltage system circuit is supplied through the drive circuit 21 to the inverter device 10 as a switching control signal for the high-voltage circuit system. Since the low-voltage system circuit and the high-voltage system circuit are isolated from each other, the drive circuit 21 is formed using, for example, an isolation element such as a photocoupler or a transformer, and a driver IC.

Meanwhile, the vehicle drive control device 1 performs fail-safe control when an abnormality has occurred in the rotating electrical machine drive system 2 including the rotating electrical machine 80 and the inverter device 10 that drives the rotating electrical machine 80. Here, abnormalities in the rotating electrical machine drive system 2 include at least one of a failure in which the switching elements 3 in the inverter device 10 go into an off state, a failure in which the switching elements 3 in the inverter device 10 go into an on state, an abnormality in the heat generation of the inverter device 10 or the rotating electrical machine 80, a failure in which the contactors 9 go into an open state, an abnormality in the passage of current through a conductor from the high-voltage battery 11 to the rotating electrical machine 80, the breaking of a wire, a failure of sensors related to the inverter device 10 and the rotating electrical machine 80, and an abnormality in the inverter control device 20.

An abnormality in the rotating electrical machine drive system 2 is determined by the vehicle drive control device 1 based on, for example, a result of detection by the current sensor 12, the rotation sensor 13, the voltage sensor 14, the temperature sensor 17 or 18, etc. That is, the vehicle drive control device 1 can perform fail-safe control when an abnormality has been detected in the rotating electrical machine drive system 2 including the rotating electrical machine 80 and the inverter device 10 that drives the rotating electrical machine 80. For example, an overcurrent state of the inverter device 10 or the rotating electrical machine 80 can be detected by the current sensor 12, a rotational abnormality such as nonuniform rotation of the rotating electrical machine 80 can be detected by the rotation sensor 13, an overvoltage state of the direct-current link capacitor 4 or the inverter device 10 can be detected by the voltage sensor 14, an overheat state of the rotating electrical machine 80 can be detected by the temperature sensor 17, and an overheat state of the inverter device 10 (switching elements 3) can be detected by the temperature sensor 18.

Not only the above-described various types of sensors, but also another control device such as the vehicle control device 100 may detect an abnormality in the rotating electrical machine drive system 2 and notify the vehicle drive control device 1 of the abnormality. For example, the vehicle control device 100 may detect that the contactors 9 have changed from a closed state to an open state, and notify the vehicle drive control device 1 of such a fact. In addition, it is preferred that when the vehicle control device 100 has actively controlled the contactors 9 to change from a closed state to an open state, too, the fact that the state of the contactors 9 has been changed be notified to the vehicle drive control device 1.

For example, it is preferred that abnormalities in the rotating electrical machine drive system 2 include the fact that the contactors 9 go into an open state during regeneration operation of the rotating electrical machine 80. The inverter control device 20 may determine the fact that the direct-current link capacitor 4 has gone into an overvoltage state, as an abnormality, based on a result of detection by the voltage sensor 14 that measures the direct-current link voltage Vdc, or may determine the fact that the contactors 9 have been opened before the direct-current link capacitor 4 goes into an overvoltage state, i.e., during regeneration operation of the rotating electrical machine 80, as an abnormality. When an abnormality has occurred in the rotating electrical machine drive system 2, the vehicle drive control device 1 changes the drive power transmission state of the first engagement device 75 and the second engagement device 95 or changes the control mode of the switching elements 3 in the inverter device 10, as fail-safe control.

Once a capacitor with a relatively large capacitance such as the direct-current link capacitor 4 has been subjected to an overvoltage, it takes time for electric charge to be released. Hence, there is a possibility that when the vehicle is stopped due to an overvoltage, even if an attempt is made to move the vehicle again, electric charge in the direct-current link capacitor 4 is not released and an overvoltage state is not canceled, and thus, the vehicle cannot be restarted. That is, there is a possibility that for a restart of the vehicle, there is a need to wait until the electric charge in the direct-current link capacitor 4 is discharged and the overvoltage state is canceled. By determining, as an abnormality, the fact that the contactors 9 have gone into an open state during regeneration operation of the rotating electrical machine 80, and performing fail-safe control such as that described later by the vehicle drive control device 1, the possibility that the direct-current link capacitor 4 goes into an overvoltage state is reduced, and even when the vehicle is stopped due to an overvoltage, the vehicle can resume operations at an early stage.

For fail-safe control whose control target is the inverter device 10, for example, shutdown control (SD) is known. The shutdown control is control to bring the inverter device 10 into an off state by changing switching control signals for all switching elements 3 forming the inverter device 10 to an inactive state. At this time, when the rotor of the rotating electrical machine 80 continues to rotate at a relatively high speed by inertia, large counter-electromotive force is generated. Electric power generated by the rotation of the rotor is rectified through the diodes 5 and charges the high-voltage battery 11 through the contactors 9 being in a closed state. When the absolute value of a current (battery current) that charges the high-voltage battery 11 significantly increases and the battery current exceeds a rated current of the high-voltage battery 11, it causes the exhaustion or breakage of the high-voltage battery 11. If the rated value of the high-voltage battery 11 is increased so that the high-voltage battery 11 can withstand a large battery current, then there is a possibility of causing an increase in size and an increase in cost.

On the other hand, when the contactors 9 are in an open state, the flow of a current into the high-voltage battery 11 is shut off. The current whose flow into the high-voltage battery 11 is shut off charges the direct-current link capacitor 4 and increases the direct-current link voltage Vdc. If the direct-current link voltage Vdc exceeds the rated voltages (absolute maximum ratings) of the inverter device 10 (switching elements 3) and the direct-current link capacitor 4, then there is a possibility that they are damaged. If the rated values of the inverter device 10 (switching elements 3) and the direct-current link capacitor 4 are increased to allow a high voltage, then there is a possibility of causing an increase in size and an increase in cost. Note that it is preferred that a reference voltage (upper limit Vulmt) which will be described later be set based on the absolute maximum ratings of the inverter device 10 (switching elements 3) and the direct-current link capacitor 4.

For fail-safe control whose control target is the inverter device 10, active short-circuit control (ASC) is also known in addition to the shutdown control. The active short-circuit control is control to allow a current to flow back between the rotating electrical machine 80 and the inverter device 10 by bringing one side, the upper-stage-side switching elements 31 of the arms 3A for all of the plurality of phases or the lower-stage-side switching elements 32 of the arms for all of the plurality of phases, into an on state and bringing the other side into an off state. Note that a case in which the upper-stage-side switching elements 31 of the arms 3A for all of the plurality of phases are brought into an on state and the lower-stage-side switching elements 32 of the arms 3A for all of the plurality of phases are brought into an off state is referred to as upper-stage-side active short-circuit control. Note also that a case in which the lower-stage-side switching elements 32 of the arms 3A for all of the plurality of phases are brought into an on state and the upper-stage-side switching elements 31 of the arms 3A for all of the plurality of phases are brought into an off state is referred to as lower-stage-side active short-circuit control.

Active short-circuit control can also be performed as fail-safe control that does not involve an increase in direct-current link voltage Vdc, but when active short-circuit control is performed upon traveling of the vehicle at a relatively high speed, high kinetic energy is supplied to the rotating electrical machine 80 from the wheels W. Due to this, in the active short-circuit control, currents flowing through the rotating electrical machine 80 and the inverter device 10 increase. If a large current continues to flow over an extended period of time, then there is a possibility that the inverter device 10 and the rotating electrical machine 80 wear out due to the large current.

As such, performing shutdown control or active short-circuit control with relatively high kinetic energy continuously supplied to the rotating electrical machine 80 is not desirable because it increases electrical load applied to the rotating electrical machine drive system 2. It is presumed that a vehicle occupant is also informed about the fact that a failure has occurred in the rotating electrical machine drive system 2 by a warning light or sound and the occupant normally reduces the travel speed of the vehicle by operating the brake. When the travel speed of the vehicle is reduced, kinetic energy provided to the rotating electrical machine 80 which is drive-coupled, as the vehicle drive device 7, to the wheels W and the internal combustion engine 70 also decreases. Therefore, it is desirable to perform fail-safe control such that at least during a high travel speed of the vehicle, the vehicle drive control device 1 promptly reduces the rotational speed of the rotating electrical machine 80 with kinetic energy, which is supplied to the rotating electrical machine 80, shut off.

Figure 3:
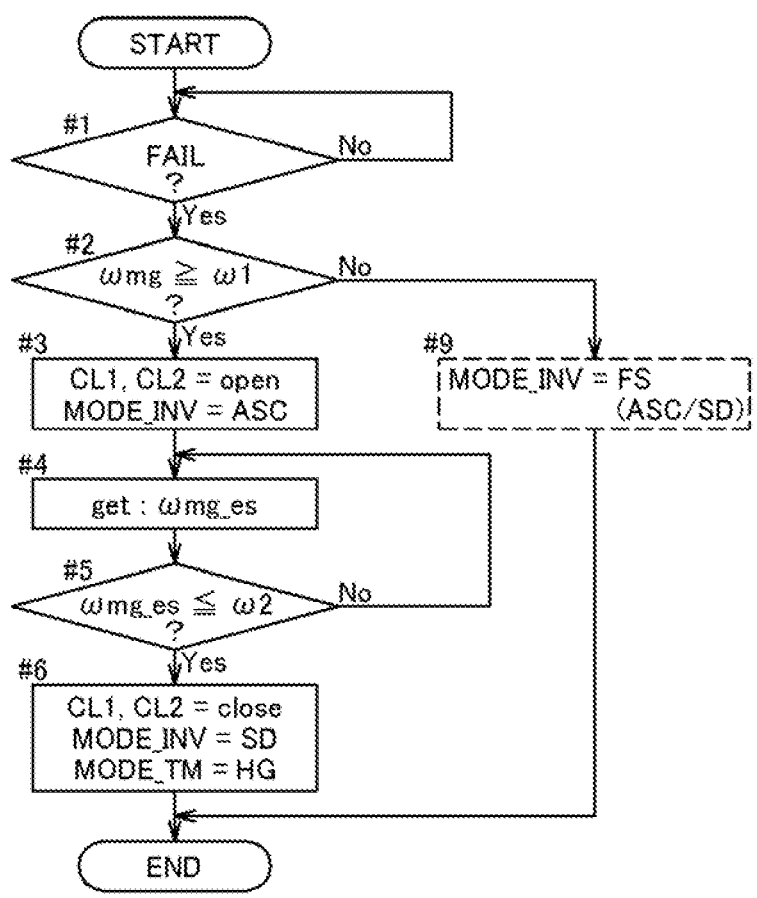
FIG. 3 is a flowchart showing exemplary fail-safe control of the vehicle drive device.

A flowchart of FIG. 3 shows an example of fail-safe control performed by the vehicle drive control device 1. If the vehicle drive control device 1 has detected the occurrence of an abnormality (FAIL) in the rotating electrical machine drive system 2 (#1), the vehicle drive control device 1 determines whether the rotational speed ωmg of the rotating electrical machine 80 is greater than or equal to a first rotational speed ω1 (#2). The first rotational speed ω1 is set to less than a rotational speed at which, as described above, a problem occurs when active short-circuit control or shutdown control is performed. If the rotational speed ωmg of the rotating electrical machine 80 is less than the first rotational speed ω1, there is no need to shut off kinetic energy supplied to the rotating electrical machine 80. Therefore, the control mode (MODE INV) of the inverter device 10 is set to fail-safe control (FS) in which active short-circuit control or shutdown control is selectively performed based on the direct-current link voltage Vdc, the rotational speed ωmg of the rotating electrical machine 80, torque, etc.

If the rotational speed ωmg of the rotating electrical machine 80 is greater than or equal to the first rotational speed ω1, the vehicle drive control device 1 brings the first engagement device (CL1) 75 and the second engagement device (CL2) 95 into a disengaged state and performs active short-circuit control (ASC) (#3). By the first engagement device 75 going into a disengaged state, the drive-coupling between the rotating electrical machine 80 and the internal combustion engine 70 (input member IN) is released, and by the second engagement device 95 going into a disengaged state, the drive-coupling between the rotating electrical machine 80 and the wheels W (output member OUT) is released. That is, the rotating electrical machine 80 goes into a state of continuing to rotate by inertia without receiving rotary drive power from other drive power sources. Here, when active short-circuit control is performed, negative torque is generated and thus the rotational speed ωmg of the rotating electrical machine 80 decreases. Along with the reduction in the rotational speed ωmg, currents flowing through the inverter device 10 and the rotating electrical machine 80 also decrease.

As described above, the vehicle occupant is also informed about the fact that a failure has occurred in the rotating electrical machine drive system 2, and the occupant normally reduces the travel speed of the vehicle by operating the brake. Hence, the rotational speed (wheel rotational speed ωwh) of the wheels W also decreases. The vehicle drive control device 1 obtains a rotational speed (estimated rotational speed ωmg_es) of the rotating electrical machine 80 obtained when the second engagement device 95 is assumed to be in an engaged state (#4). As will be described later with reference to FIG. 4, it is preferred that the vehicle drive control device 1 calculate the estimated rotational speed ωmg_es based on the wheel rotational speed ωwh (or the rotational speed of the output member OUT).

If the vehicle drive control device 1 determines that the estimated rotational speed ωmg_es is less than or equal to a second rotational speed ω2 (reference rotational speed), the vehicle drive control device 1 allows the control mode (INV_MODE) of the inverter device 10 to transition from the active short-circuit control to shutdown control (SD) (#5 and #6). The second rotational speed ω2 (reference rotational speed) is set to a rotational speed at which a counter-electromotive voltage Vcev generated by the rotating electrical machine 80 does not exceed the withstand voltage (upper limit Vulmt) of the rotating electrical machine drive system 2. When the condition at step #5 is satisfied, even if rotary drive power from the wheels W is received, the counter-electromotive voltage Vcev of the rotating electrical machine 80 does not exceed the direct-current link voltage Vdc. Hence, it can be expected that charging from the rotating electrical machine 80 to the high-voltage battery 11 and direct-current link capacitor 4 side does not occur. Therefore, the above-described problem does not occur and the vehicle drive control device 1 brings the first engagement device 75 and the second engagement device 95 into an engaged state so that the drive power of the vehicle drive device 7 (in this case, the drive power of the internal combustion engine 70) can be transmitted to the wheels W (#6). The vehicle occupant can move and stop the vehicle in a safe location using drive power generated by the internal combustion engine 70.

When, as in the present embodiment, the second engagement device 95 is included in the transmission device 90, it is preferred that the gear ratio also be adjusted at step #6. Namely, it is preferred to set the gear ratio such that the rotation of the rotating electrical machine 80 that follows the rotation of the wheels W further decreases and the counter-electromotive voltage Vcev decreases. Specifically, it is preferred to set the control mode (MODE_TM) of the transmission device 90 to a control mode (high-geared control (HG)) in which the gear ratio is higher than in normal times.

In addition, at this time, it is further preferred to control the gear ratio GR of the transmission device 90 to the highest gear ratio within a range in which the counter-electromotive voltage Vcev of the rotating electrical machine 80 does not exceed the direct-current link voltage Vdc. By doing so, torque can be transmitted to the wheels W side without generating a current from the rotating electrical machine 80 to the high-voltage battery 11 and direct-current link capacitor 4 side and with torque from the internal combustion engine 70 not attenuated too much. Therefore, when the vehicle is moved to a safe location using drive power generated by the internal combustion engine 70, torque transmitted to the wheels W can be readily secured.

Namely, when, after the vehicle drive control device 1 brings the first engagement device 75 and the second engagement device 95 into a disengaged state when an abnormality has occurred in the rotating electrical machine drive system 2, the estimated rotational speed ωmg_es of the rotating electrical machine 80 based on the wheel rotational speed ωwh, which is obtained when the second engagement device 95 is assumed to be is in an engaged state, has reached less than or equal to the reference rotational speed (second rotational speed $\omega 2$), the vehicle drive control device 1 brings the first engagement device 75 and the second engagement device 95 into an engaged state with the internal combustion engine 70 operating. Furthermore, with the first engagement device 75 and the second engagement device 95 being in the engaged state, the vehicle drive control device 1 performs shutdown control in which all switching elements 3 in the inverter device 10 are brought into an off state. That is, the vehicle drive control device 1 allows the control mode of the inverter device 10 to transition from active short-circuit control to shutdown control.

Figure 4:
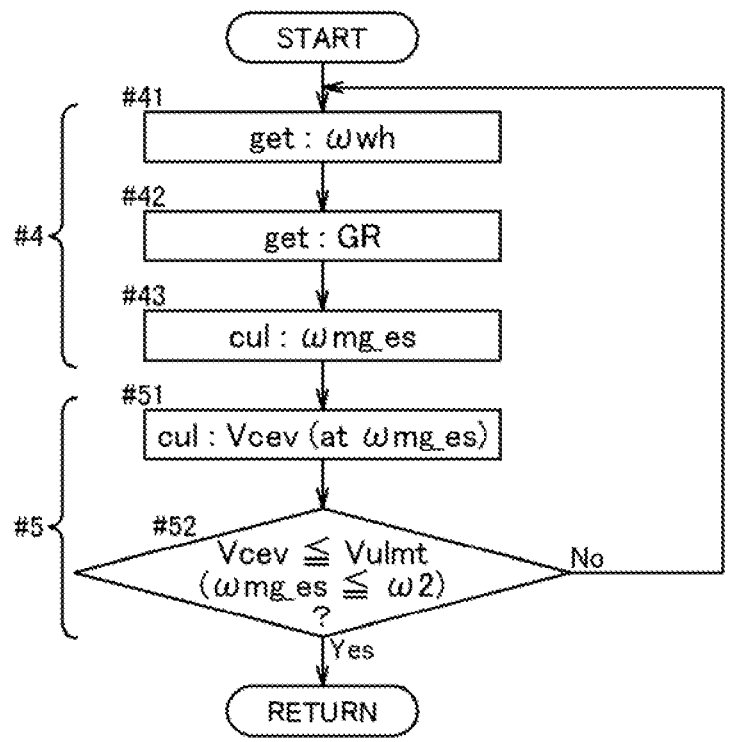
FIG. 4 is a flowchart showing an exemplary transition of a control method performed upon fail-safe control.

When transition conditions including at least conditions regarding the rotational speed $\omega mg$ of the rotating electrical machine 80 and the voltage (direct-current link voltage Vdc) on the direct-current side of the inverter device 10 are satisfied, the vehicle drive control device 1 allows the control mode to transition from active short-circuit control to shutdown control. A flowchart of FIG. 4 shows an example of transition conditions used when the control mode of fail-safe control is changed at step #4 and #5 of FIG. 3. At step #4, the vehicle drive control device 1 first obtains a wheel rotational speed $\omega wh$ (which may be the rotational speed of the output member OUT) (#41). When, as in the present embodiment, the transmission device 90 is provided in the mechanical power transmission path between the wheels W and the rotating electrical machine 80, a gear ratio GR of the transmission device 90 is also further obtained (#42). The vehicle drive control device 1 can calculate an estimated rotational speed $\omega mg\_es$ of the rotating electrical machine 80 corresponding to the rotational speed of the middle member M (the rotational speed of the input shaft of the transmission device 90 and the output shaft of the rotating electrical machine 80), using the wheel rotational speed $\omega wh$ and the gear ratio GR (#43). Note that when the transmission device 90 is not provided, the gear ratio GR is set to "1", which makes it equivalent.

Furthermore, the vehicle drive control device 1 calculates a counter-electromotive voltage Vcev generated when the rotating electrical machine 80 rotates at the estimated rotational speed $\omega mg\_es$ (#51). Then, the vehicle drive control device 1 determines whether the counter-electromotive voltage Vcev is less than or equal to an upper limit Vulmt of the direct-current link voltage Vdc (#52). Since the counter-electromotive voltage Vcev is substantially proportional to the rotational speed $\omega mg$ of the rotating electrical machine 80, the determination may be made using a transition condition that the value of a rotational speed $\omega mg$ at which a counter-electromotive voltage Vcev corresponding to the upper limit Vulmt is generated is less than or equal to the estimated rotational speed $\omega mg\_es$. Note that this value corresponds to the second rotational speed $\omega 2$ at step #5.

As such, the transition conditions depend on the estimated rotational speed $\omega mg\_es$. In addition, when the transmission device 90 is provided, the rotational speed $\omega mg$ of the rotating electrical machine 80 can be reduced relative to the wheel rotational speed $\omega wh$ using the gear ratio GR. Therefore, when the transmission device 90 that can change the gear ratio GR is provided in the mechanical power transmission path between the rotating electrical machine 80 and the wheels W, it is preferred that the gear ratio GR of the transmission device 90 be set such that the rotational speed $\omega mg$ of the rotating electrical machine 80 that follows the rotation of the wheels W is less than or equal to a rotational speed ($\omega 2$) at which the counter-electromotive voltage Vcev generated by the rotating electrical machine 80 is less than or equal to a predefined reference voltage (upper limit Vulmt).

The above description exemplifies a mode in which when, after the vehicle drive control device 1 brings the first engagement device 75 and the second engagement device 95 into a disengaged state when an abnormality has occurred in the rotating electrical machine drive system 2, the rotational speed (estimated rotational speed $\omega mg\_es$) of the rotating electrical machine 80 based on the rotational speed (wheel rotational speed $\omega wh$) of the wheels W, which is obtained when the second engagement device 95 is assumed to be is in an engaged state, has reached less than or equal to the second rotational speed $\omega 2$ which is a predefined reference rotational speed, the vehicle drive control device 1 brings the first engagement device 75 and the second engagement device (95) into an engaged state with the internal combustion engine 70 operating. However, a rotational speed subjected to determination using the reference rotational speed is not limited to the estimated rotational speed $\omega mg\_es$. When, after the vehicle drive control device 1 brings the first engagement device 75 and the second engagement device 95 into a disengaged state when an abnormality has occurred in the rotating electrical machine drive system 2, a rotational speed based on the rotational speed of the input member IN, the rotating electrical machine 80, or the output member OUT has reached less than or equal to the predefined reference rotational speed, the vehicle drive control device 1 can bring the first engagement device 75 and the second engagement device 95 into an engaged state with the internal combustion engine 70 operating.

The above description exemplifies shutdown control and active short-circuit control as fail-safe control. In addition to them, torque reduction control in which the torque of the rotating electrical machine 80 is reduced is also one of fail-safe controls. The torque reduction control is control to reduce the torque of the rotating electrical machine 80, with torque control or rotational speed control continuing. In the torque control the rotating electrical machine 80 is controlled based on a target torque, and in the rotational speed control the rotating electrical machine 80 is controlled based on a target speed. Although the above description exemplifies a mode in which the vehicle drive control device 1 performs active short-circuit control with the first engagement device 75 and the second engagement device 95 brought into a disengaged state when an abnormality has occurred in the rotating electrical machine drive system 2, the vehicle drive control device 1 may perform torque reduction control instead of active short-circuit control.

Here, zero-torque control which is one example of such control will be described. In the present embodiment, the rotating electrical machine 80 is controlled by performing current feedback control using a current vector control method in a two-axis orthogonal vector space (orthogonal vector coordinate system) that rotates in synchronization with the rotation of the rotating electrical machine 80. In the current vector control method, current feedback control is performed, for example, in an orthogonal vector coordinate system (d-q-axis vector coordinate system) with two axes, a d-axis along a direction of field flux generated by a permanent magnet (a field current axis or a field axis) and a q-axis which is electrically advanced by $\pi/2$ relative to the d-axis (a drive current axis or a drive axis). The inverter control device 20 determines a torque instruction T* based on a target torque of the rotating electrical machine 80 which is a control target, and determines a d-axis current instruction Id* and a q-axis current instruction Iq*.

FIG. 5 schematically shows the operating points (P1, etc.) of the rotating electrical machine 80 in a current vector space (current vector coordinate system). In FIG. 5, reference signs "200" (201 to 203) each indicates an equal torque line representing a vector locus of an armature current at which the rotating electrical machine 80 outputs a certain torque. A second equal torque line 202 is lower in torque than a first equal torque line 201, and a third equal torque line 203 is even lower in torque than the second equal torque line 202.

Curves "300" each represent a voltage speed ellipse (voltage limit ellipse). When the counter-electromotive voltage of the rotating electrical machine 80 exceeds the direct-current link voltage Vdc, the rotating electrical machine 80 cannot be controlled, and thus, a range of current instructions that can be set is limited by a voltage speed ellipse 300 which is a vector locus of an armature current (a vector sum of a d-axis current Id and a q-axis current Iq). In other words, the voltage speed ellipse is a vector locus representing a range of current instructions that can be set according to the value of the direct-current voltage (direct-current link voltage Vdc) of the inverter 10 and the rotational speed ω of the rotating electrical machine 80 that affects the magnitude of the counter-electromotive voltage. That is, the size of the voltage speed ellipse 300 is determined based on the direct-current link voltage Vdc and the rotational speed ω of the rotating electrical machine 80. Specifically, the diameter of the voltage speed ellipse 300 is proportional to the direct-current link voltage Vdc, and is inversely proportional to the rotational speed ω of the rotating electrical machine 80. Current instructions (Id* and Iq*) are set as values at an operating point on an equal torque line 200 present within a voltage speed ellipse 300 in such a current vector coordinate system.

It is assumed that the inverter control device 20 controls the rotating electrical machine 80, for example, in torque mode (e.g., pulse width modulation control according to a target torque) as normal operation, at a point in time when the inverter control device 20 has determined that fail-safe control (zero-torque control) needs to be performed. A first operating point P1 shown in FIG. 5 indicates the operating point of the rotating electrical machine 80 in the current vector coordinate system at this point in time. In other words, the rotating electrical machine 80 performs regeneration operation in torque mode which is normal operation, at the first operating point P1 on the third equal torque line 203. Although here a mode in which the rotating electrical machine 80 performs regeneration operation is exemplified for convenience sake, for example, it may be assumed that the rotating electrical machine 80 having performed motoring operation at a second operating point P2 represented by an open white circle has transitioned to regeneration operation.

Upon performing zero-torque control, the inverter control device 20 sets a torque instruction T* such that the torque of the rotating electrical machine 80 reaches zero, to reduce the q-axis current Iq (drive current) to a zero state. At this time, the q-axis current Iq is reduced and the d-axis current Id (field current) may be increased to increase the armature current, with the torque (=zero) based on the torque instruction T* maintained. When an origin is included in a range of a voltage speed ellipse 300 like a first voltage speed ellipse 301, the inverter control device 20 performs control such that the operating point moves to the origin (P0). In addition, when the origin is not included in a range of a voltage speed ellipse 300 like a second voltage speed ellipse 302, a third voltage speed ellipse 303, and a fourth voltage speed ellipse 304, the inverter control device 20 performs control such that the operating point moves to a point of intersection (P300) of the voltage speed ellipse 300 and the d-axis.

For example, when the contactors 9 are released, by allowing more armature current than regeneration current to flow, electric charge can be emitted from the direct-current link capacitor 4. At this time, particularly, for the d-axis current Id that does not contribute to torque, it is also preferred to increase loss by allowing more d-axis current Id to continue to flow without reducing the amount of the current. For example, the d-axis current Id may be increased while allowing the torque to approach zero by reducing the q-axis current Iq from the first operating point P1. It is preferred that the locus of an operating point be set based on the coordinates of the operating point, the decrease rate of the q-axis current Iq, and the increase rate of the d-axis current Id, giving priority to a reduction in the q-axis current Iq.

Although the above description exemplifies a mode in which zero-torque control (torque reduction control) is performed, deceleration control in which torque in an opposite direction to the rotational direction of the rotating electrical machine 80 is outputted may be performed. For example, the second operating point P2 may be moved to the first operating point P1 by changing the q-axis current Iq within a range in which the q-axis current Iq does not exceed a voltage speed ellipse 300, without changing the d-axis current Id.

SUMMARY OF THE EMBODIMENT

A summary of a vehicle drive control device (1) described above will be briefly described below.

As one aspect, in the vehicle drive control device (1) that controls a vehicle drive device (7) in which a first engagement device (75), a rotating electrical machine (80), and a second engagement device (95) are provided in this order from an input member (IN) side in a mechanical power transmission path connecting an input member (IN) which is drive-coupled to an internal combustion engine (70) serving as a vehicle's drive power source to an output member (OUT) which is drive-coupled to wheels (W), each of the first engagement device (75) and the second engagement device (95) can be changed between an engaged state in which drive power is transmitted and a disengaged state in which drive power is not transmitted, when an abnormality has occurred in a rotating electrical machine drive system (2) including an inverter device (10) and the rotating electrical machine (80), the first engagement device (75) and the second engagement device (95) are brought into a disengaged state, the inverter device (10) being connected to a direct-current power supply (11) and the rotating electrical machine of alternating current (80) and converting electric power between direct current and alternating current, by which the rotating electrical machine (80) is driven, and when, after bringing the first engagement device (75) and the second engagement device (95) into a disengaged state, a rotational speed based on a rotational speed of the input member (IN), the rotating electrical machine (80), or the output member (OUT) has reached less than or equal to a predefined reference rotational speed (ω2), the first engagement device (75) and the second engagement device (95) are brought into an engaged state with the internal combustion engine (70) operating.

By the first engagement device (75) and the second engagement device (95) going into a disengaged state, the rotating electrical machine (80) goes into a state in which drive power from the wheels (W) and the internal combustion engine (70) is not transmitted thereto. That is, counter-electromotive force (Vcev) that is generated by the rotating electrical machine (80) rotated by the wheels (W) and the internal combustion engine (70) is suppressed. When the rotating electrical machine (80) rotates when an abnormality has been detected in the rotating electrical machine drive system (2), the rotating electrical machine (80) continues to rotate by inertia, but counter-electromotive force (Vcev) generated at that time is only that generated by the inertial rotation. The rotational speed (ωmg) of the inertial rotation can be reduced by controlling the rotating electrical machine (80). Hence, when an abnormality has occurred in the rotating electrical machine drive system (2) that drives the rotating electrical machine (80) provided in the mechanical power transmission path to the wheels (W), the rotational speed (ωmg) of the rotating electrical machine (80) can be promptly reduced while suppressing an increase in electrical load on the rotating electrical machine drive system (2).

In addition, even when drive power to the wheels (W) cannot be outputted due to the occurrence of an abnormality in the rotating electrical machine drive system (2), by bringing the first engagement device (75) and the second engagement device (95) into an engaged state, drive power generated by the internal combustion engine (70) can be provided to the wheels (W). By this, when an abnormality has occurred in the rotating electrical machine drive system (2), a vehicle occupant can move and stop the vehicle in a safe location using drive power generated by the internal combustion engine (70). Note that the first engagement device (75) and the second engagement device (95) are brought into an engaged state on the condition that a rotational speed based on the rotational speed of the input member (IN), the rotating electrical machine (80), or the output member (OUT) (e.g., an estimated rotational speed (ωmg_es) of the rotating electrical machine (80)) is less than or equal to the reference rotational speed (ω2), and thus, the electrical load on the rotating electrical machine (80) that generates electric power following the internal combustion engine (70) and the wheels (W) is suppressed. Namely, according to this configuration, when an abnormality has occurred in the rotating electrical machine drive system (2) that drives the rotating electrical machine (80) provided in the mechanical power transmission path to the wheels (W), the rotational speed (ωmg) of the rotating electrical machine (80) can be promptly reduced while suppressing an increase in electrical load on the rotating electrical machine drive system (2) so as to reduce the time during which evacuation travel is affected.

Here, it is preferred that the reference rotational speed (ω2) be set to a rotational speed (co) at which a counter-electromotive voltage (Vcev) generated by the rotating electrical machine (80) does not exceed a withstand voltage (Vulmt) of the rotating electrical machine drive system (2).

When the second engagement device (95) is switched to an engaged state from a disengaged state, the rotating electrical machine (80) rotates following the wheels (W) and thus generates a counter-electromotive voltage (Vcev). However, when the rotational speed (ωmg_es) of the rotating electrical machine (80) obtained when the second engagement device (95) is assumed to be is in an engaged state is less than or equal to the reference rotational speed (ω2), the counter-electromotive voltage (Vcev) generated by the following rotation does not exceed the withstand voltage (Vulmt) of the rotating electrical machine drive system (2). Therefore, the possibility of causing an overvoltage, etc., in the rotating electrical machine drive system (2) is suppressed, and drive power can be provided from the vehicle drive device (2) to the wheels (W).

In addition, it is preferred that when the inverter device (10) is connected to the direct-current power supply (11) and the rotating electrical machine (80) and converts electric power between direct current and alternating current of a plurality of phases, and has an arm (3A) for one phase of alternating current which is formed of a series circuit including an upper-stage-side switching element (31) and a lower-stage-side switching element (32), and includes a freewheeling diode (5) connected in parallel to each switching element (3) with a direction going from a lower-stage side to an upper-stage side being a forward direction, the vehicle drive control device (1) perform either one of active short-circuit controls (ASC) including an upper-stage-side active short-circuit control in which the upper-stage-side switching elements (31) of the arms (3A) for all of a plurality of phases are brought into an on state, and a lower-stage-side active short-circuit control in which the lower-stage-side switching elements (32) of the arms (3A) for all of a plurality of phases are brought into an on state, with the first engagement device (75) and the second engagement device (95) brought into a disengaged state when an abnormality has occurred in the rotating electrical machine drive system (2).

For example, if all switching elements (3) go into an off state when the rotating electrical machine (80) rotates at a high speed, then there is a possibility that electric power generated by the rotating electrical machine (80) suddenly increases the voltage (Vdc) on the direct-current side of the inverter device (10). By allowing a current generated by the electric power generation of the rotating electrical machine (80) to flow back between the inverter device (10) and the rotating electrical machine (80) by active short-circuit control (ASC), and allowing energy to be consumed by heat generated upon the flowing back, an increase in the voltage on the direct-current side can be suppressed. In addition, since negative torque is generated in the rotating electrical machine (80) by the active short-circuit control (ASC) and the rotational speed (ωmg) of the rotating electrical machine (80) also decreases, the amount of heat generated by the rotating electrical machine (80) can also be suppressed.

Here, it is preferred that when, after bringing the first engagement device (75) and the second engagement device (95) into a disengaged state when an abnormality has occurred in the rotating electrical machine drive system (2), the rotational speed based on the rotational speed of the input member (IN), the rotating electrical machine (80), or the output member (OUT) has reached less than or equal to the reference rotational speed (ω2), the first engagement device (75) and the second engagement device (95) be brought into an engaged state with the internal combustion engine (70) operating, and shutdown control (SD) in which all of the switching elements (3) in the inverter device (10) are brought into an off state be performed with the first engagement device (75) and the second engagement device (95) being in an engaged state.

In the shutdown control (SD), the rotating electrical machine drive system (2) cannot output drive power to the wheels (W), but by bringing the first engagement device (75) and the second engagement device (95) into an engaged state, drive power generated by the internal combustion engine (70) can be provided to the wheels (W). By this, when an abnormality has occurred in the rotating electrical machine drive system (2), the vehicle occupant can move and stop the vehicle in a safe location using drive power generated by the internal combustion engine (70). Note that, as described above, if shutdown control (SD) in which all switching elements (3) are brought into an off state is performed when the rotating electrical machine (80) rotates at a high speed, then there is a possibility that the voltage on the direct-current side of the inverter device (10) suddenly increases due to electric power generated by the rotating electrical machine (80). In this configuration, the rotational speed (ωmg) of the rotating electrical machine (80) is reduced by active short-circuit control (ASC) with the rotating electrical machine (80) not rotating following the internal combustion engine (70) and the wheels (90), and shutdown control (SD) is performed on the condition that a rotational speed based on the rotational speed of the input member (IN), the rotating electrical machine (80), or the output member (OUT) (e.g., an estimated rotational speed (ωmg_es) of the rotating electrical machine (80)) is less than or equal to the reference rotational speed (ω2). Hence, a significant increase in the voltage on the direct-current side of the inverter device (10) is suppressed.

Here, it is preferred that when transition conditions including at least conditions regarding a rotational speed (ωmg) of the rotating electrical machine (80) and a voltage (Vdc) on a direct-current side of the inverter device (10) are satisfied, the vehicle drive control device (1) allow a control mode to transition from the active short-circuit control (ASC) to the shutdown control (SD).

If the rotating electrical machine (80) rotates following the internal combustion engine (70) and the wheels (90) and all switching elements (3) in the inverter device (10) are in an off state, then there is a possibility that the voltage (Vdc) on the direct-current side of the inverter device (10) increases due to the counter-electromotive voltage (Vcev) of the rotating electrical machine (80). It is desirable that even if the voltage (Vdc) on the direct-current side of the inverter device (10) increases, the electrical load on the rotating electrical machine drive system (2) be suppressed. Since the counter-electromotive voltage (Vcev) is substantially proportional to the rotational speed (ωmg) of the rotating electrical machine (80), it is preferred that the transition conditions be set so as to include at least conditions regarding the rotational speed (ωmg) of the rotating electrical machine (80) and the voltage (Vdc) on the direct-current side of the inverter device (10).

In addition, it is preferred that when a transmission device (90) that can change a gear ratio is provided in the mechanical power transmission path between the rotating electrical machine (80) and the wheels (W), the vehicle drive control device (1) set the gear ratio of the transmission device (90) such that a rotational speed (ωmg) of the rotating electrical machine (80) that follows rotation of the wheels (W) is less than or equal to a rotational speed at which a counter-electromotive voltage (Vcev) generated by the rotating electrical machine (80) is less than or equal to a predefined reference voltage (Vulmt).

When the second engagement device (95) is in an engaged state, the rotating electrical machine (80) rotates following the wheels (W). When the transmission device (TM) is provided in the mechanical power transmission path between the rotating electrical machine (80) and the wheels (W), the rotational speed (ωmg) of the rotating electrical machine (80) can be reduced relative to the rotational speed (ωwh) of the wheels (W) using the gear ratio (GR). If the counter-electromotive voltage (Vcev) does not exceed the direct-current link voltage (Vdc), then a current does not flow into a circuit (e.g., the direct-current power supply (11), the smoothing capacitor (4), etc.) side connected to the direct-current side of the inverter device (10), from the rotating electrical machine (80). Since the magnitude of the counter-electromotive voltage (Vcev) is substantially proportional to the rotational speed (ωmg) of the rotating electrical machine (80), by controlling the gear ratio (GR) of the transmission device (TM) according to the rotational speed (ωwh) of the wheels (W), the counter-electromotive voltage (Vcev) can be controlled so as not to exceed the direct-current link voltage (Vdc). Therefore, it is preferred that the gear ratio (GR) of the transmission device (90) be set such that the rotational speed (ωmg) of the rotating electrical machine (80) that rotates following the wheels (W) is less than or equal to a rotational speed (ω2) at which the counter-electromotive voltage (Vcev) generated by the rotating electrical machine (80) is less than or equal to the reference voltage (Vulmt). By this, torque can be transmitted to the wheels (W) side without generating a current flowing into the direct-current side of the inverter device (10) from the rotating electrical machine (80) and with torque from the internal combustion engine (70) not attenuated too much. Therefore, when the vehicle is moved to a safe location using drive power generated by the internal combustion engine (70), torque transmitted to the wheels (W) can be readily secured.

In addition, as one aspect, it is preferred that when the inverter device (10) is connected to the direct-current power supply (11) and the rotating electrical machine of alternating current (80) and convers electric power between direct current and alternating current, and the rotating electrical machine drive system (2) includes contactors (9) that electrically connect the direct-current power supply (11) to the inverter device (10) when the contactors (9) are in a closed state, and cut off an electrical connection between the direct-current power supply (11) and the inverter device (10) when the contactors (9) are in an open state, abnormalities in the rotating electrical machine drive system (2) include a fact that the contactors (9) go into an open state during regeneration operation of the rotating electrical machine (80).

When the rotating electrical machine (80) performs regeneration operation, electrical energy generated by the rotating electrical machine (80) is supplied through the inverter device (10) to the direct-current power supply (11) from the rotating electrical machine (80). Here, when the contactors (9) between the inverter device (10) and the direct-current power supply (11) go into an open state, the electrical energy generated by the rotating electrical machine (80) is not supplied to the direct-current power supply (11). In many cases, a smoothing capacitor (4) for smoothing a direct-current voltage (Vdc) is provided on the direct-current side of the inverter device (10). The electrical energy that is not supplied to the direct-current power supply (11) charges the smoothing capacitor (4), and the voltage between the terminals of the smoothing capacitor (4) increases. Since the capacitance of the smoothing capacitor (4) of the inverter device (10) is generally relatively large, when the smoothing capacitor (4) goes into an overvoltage state, it takes time to discharge electric charge in the smoothing capacitor (4). For example, even if, after determining an overvoltage of the smoothing capacitor (4) as an abnormality and stopping the vehicle, an attempt is made to restart the vehicle, when the electric charge in the smoothing capacitor (4) is not released, an overvoltage state is not canceled and an abnormal state is not cancelled, either, and thus, a restart is limited. However, by including the fact that the contactors (9) go into an open state during the regeneration operation of the rotating electrical machine (80) in abnormalities in the rotating electrical machine drive system (2), as described above, electrical energy generated by the rotating electrical machine (80) can be promptly reduced, and an increase in the voltage between the terminals of the smoothing capacitor (4) can also be reduced.

In addition, for example, when an overvoltage of the smoothing capacitor (4) is determined as an abnormality and the vehicle is stopped, too, the vehicle can be restarted more quickly.

The invention claimed is:

1. A vehicle drive control device that controls a vehicle drive device in which a first engagement device, a rotating electrical machine, and a second engagement device are provided in this order from an input side in a mechanical power transmission path connecting an input to an output, the input being drive-coupled to an internal combustion engine serving as a vehicle drive power source, and the output being drive-coupled to wheels, wherein each of the first engagement device and the second engagement device can be changed between an engaged state in which drive power is transmitted and a disengaged state in which drive power is not transmitted, the vehicle control device comprising:

an electronic control unit that is configured to:
when an abnormality has occurred in a rotating electrical machine drive system including an inverter device and the rotating electrical machine, the electronic control unit brings the first engagement device and the second engagement device into a disengaged state, the inverter device being connected to a direct-current power supply and the rotating electrical machine and converting electric power between direct current and alternating current, by which the rotating electrical machine is driven, and when, after the electronic control unit brings the first engagement device and the second engagement device into a disengaged state, and a rotational speed of the input, the rotating electrical machine, or the output is less than or equal to a predefined reference rotational speed, the electronic control unit brings the first engagement device and the second engagement device into an engaged state with the internal combustion engine operating.

2. The vehicle drive control device according to claim 1, wherein the reference rotational speed is set to a rotational speed at which a counter-electromotive voltage generated by the rotating electrical machine does not exceed a withstand voltage of the rotating electrical machine drive system.

3. The vehicle drive control device according to claim 2, wherein
in the inverter device, an arm for one phase of alternating current is formed of a series circuit including an upper-stage-side switching element and a lower-stage-side switching element, and a freewheeling diode connected in parallel to each switching element is provided with a direction going from a lower-stage side to an upper-stage side being a forward direction, and
with the first engagement device and the second engagement device brought into a disengaged state when an abnormality has occurred in the rotating electrical machine drive system, the electronic control unit performs either one of active short-circuit controls, the active short-circuit controls including an upper-stage-side active short-circuit control in which the upper-stage-side switching elements of the arms for all of a plurality of phases are brought into an on state, and a lower-stage-side active short-circuit control in which the lower-stage-side switching elements of the arms for all of a plurality of phases are brought into an on state.

4. The vehicle drive control device according to claim 3, wherein
when, after bringing the first engagement device and the second engagement device into a disengaged state when an abnormality has occurred in the rotating electrical machine drive system, a rotational speed of the input, the rotating electrical machine, or the output is less than or equal to the reference rotational speed, the electronic control unit brings the first engagement device and the second engagement device into an engaged state with the internal combustion engine operating, and
with the first engagement device and the second engagement device being in an engaged state, the electronic control unit performs shutdown control, the shutdown control bringing all of the switching elements in the inverter device into an off state.

5. The vehicle drive control device according to claim 4, wherein when transition conditions are satisfied, the electronic control unit performs a transition from the active short-circuit control to the shutdown control, the transition conditions including at least conditions regarding a rotational speed of the rotating electrical machine and a voltage on a direct-current side of the inverter device.

6. The vehicle drive control device according to claim 5, wherein a transmission device that can change a gear ratio is provided in a mechanical power transmission path between the rotating electrical machine and the wheels, and the gear ratio of the transmission device is set such that a rotational speed of the rotating electrical machine that follows rotation of the wheels is less than or equal to a rotational speed at which a counter-electromotive voltage generated by the rotating electrical machine is less than or equal to a predefined reference voltage.

7. The vehicle drive control device according to claim 6, wherein
the rotating electrical machine drive system includes a contactor that electrically connects the direct-current power supply to the inverter device when the contactor is in a closed state, and cut off an electrical connection between the direct-current power supply and the inverter device when the contactor is in an open state, and
abnormalities in the rotating electrical machine drive system include a fact that the contactor goes into an open state during regeneration operation of the rotating electrical machine.

8. The vehicle drive control device according to claim 1, wherein
in the inverter device, an arm for one phase of alternating current is formed of a series circuit including an upper-stage-side switching element and a lower-stage-side switching element, and a freewheeling diode connected in parallel to each switching element is provided with a direction going from a lower-stage side to an upper-stage side being a forward direction, and
with the first engagement device and the second engagement device brought into a disengaged state when an abnormality has occurred in the rotating electrical machine drive system, the electronic control unit performs either one of active short-circuit controls, the active short-circuit controls including an upper-stage-side active short-circuit control in which the upper-stage-side switching elements of the arms for all of a plurality of phases are brought into an on state, and a lower-stage-side active short-circuit control in which the lower-stage-side switching elements of the arms for all of a plurality of phases are brought into an on state.

9. The vehicle drive control device according to claim 8, wherein when, after bringing the first engagement device and the second engagement device into a disengaged state when an abnormality has occurred in the rotating electrical machine drive system, a rotational speed of the input, the rotating electrical machine, or the output has reached less than or equal to the reference rotational speed, the electronic control unit brings the first engagement device and the second engagement device into an engaged state with the internal combustion engine operating, and with the first engagement device and the second engagement device being in an engaged state, the electronic control unit performs shutdown control, the shutdown control bringing all of the switching elements in the inverter device into an off state.

10. The vehicle drive control device according to claim 9, wherein when transition conditions are satisfied, the electronic control unit performs a transition from the active short-circuit control to the shutdown control, the transition conditions including at least conditions regarding a rotational speed of the rotating electrical machine and a voltage on a direct-current side of the inverter device.

11. The vehicle drive control device according to claim 10, wherein a transmission device that can change a gear ratio is provided in a mechanical power transmission path between the rotating electrical machine and the wheels, and the gear ratio of the transmission device is set such that a rotational speed of the rotating electrical machine that follows rotation of the wheels is less than or equal to a rotational speed at which a counter-electromotive voltage generated by the rotating electrical machine is less than or equal to a predefined reference voltage.

12. The vehicle drive control device according to claim 11, wherein the rotating electrical machine drive system includes a contactor that electrically connects the direct-current power supply to the inverter device when the contactor is in a closed state, and cut off an electrical connection between the direct-current power supply and the inverter device when the contactor is in an open state, and abnormalities in the rotating electrical machine drive system include a fact that the contactor goes into an open state during regeneration operation of the rotating electrical machine.

13. The vehicle drive control device according to claim 1, wherein a transmission device that can change a gear ratio is provided in a mechanical power transmission path between the rotating electrical machine and the wheels, and the electronic control unit sets the gear ratio of the transmission device such that a rotational speed of the rotating electrical machine that follows rotation of the wheels is less than or equal to a rotational speed at which a counter-electromotive voltage generated by the rotating electrical machine is less than or equal to a predefined reference voltage.

14. The vehicle drive control device according to claim 13, wherein the rotating electrical machine drive system includes a contactor that electrically connects the direct-current power supply to the inverter device when the contactor is in a closed state, and cut off an electrical connection between the direct-current power supply and the inverter device when the contactor is in an open state, and abnormalities in the rotating electrical machine drive system include a fact that the contactor goes into an open state during regeneration operation of the rotating electrical machine.

15. The vehicle drive control device according to claim 1, wherein the rotating electrical machine drive system includes a contactor that electrically connects the direct-current power supply to the inverter device when the contactor is in a closed state, and cut off an electrical connection between the direct-current power supply and the inverter device when the contactor is in an open state, and abnormalities in the rotating electrical machine drive system include a fact that the contactor goes into an open state during regeneration operation of the rotating electrical machine.

* * * * *